(12) United States Patent
Kitagawa et al.

(10) Patent No.: US 9,506,152 B2
(45) Date of Patent: Nov. 29, 2016

(54) RESIN COATED METAL SHEET

(75) Inventors: Junichi Kitagawa, Tokyo (JP);
Yoichiro Yamanaka, Tokyo (JP);
Yusuke Nakagawa, Tokyo (JP);
Katsumi Kojima, Tokyo (JP); Mikito Suto, Tokyo (JP); Yoichi Tobiyama, Tokyo (JP)

(73) Assignee: JFE Steel Corporation (JP)

( * ) Notice: Subject to any disclaimer, the term of this patent is extended or adjusted under 35 U.S.C. 154(b) by 248 days.

(21) Appl. No.: 14/236,221

(22) PCT Filed: Aug. 31, 2011

(86) PCT No.: PCT/JP2011/069718
§ 371 (c)(1),
(2), (4) Date: Jan. 30, 2014

(87) PCT Pub. No.: WO2013/030972
PCT Pub. Date: Mar. 7, 2013

(65) Prior Publication Data
US 2014/0162055 A1 Jun. 12, 2014

(51) Int. Cl.
*B32B 7/02* (2006.01)
*B32B 15/08* (2006.01)
(Continued)

(52) U.S. Cl.
CPC .......... *C23C 28/00* (2013.01); *B32B 1/02* (2013.01); *B32B 7/02* (2013.01); *B32B 7/12* (2013.01); *B32B 15/00* (2013.01); *B32B 15/08* (2013.01); *B32B 15/09* (2013.01); *B32B 27/08* (2013.01); *B32B 27/18* (2013.01); *B32B 27/20* (2013.01); *B32B 27/36* (2013.01); *B32B 2250/03* (2013.01); *B32B 2250/05* (2013.01); *B32B 2255/10* (2013.01); *B32B 2307/30* (2013.01); *B32B 2307/702* (2013.01); *B32B 2307/746* (2013.01); *B32B 2311/00* (2013.01); *B32B 2367/00* (2013.01); *B32B 2391/00* (2013.01); *C08K 3/0033* (2013.01); *C08K 2003/2241* (2013.01); *C08L 67/02* (2013.01); *C08L 67/03* (2013.01);
(Continued)

(58) Field of Classification Search
None
See application file for complete search history.

(56) References Cited

U.S. PATENT DOCUMENTS 4,362,775 A * 12/1982 Yabe ............... B32B 15/08
156/332
4,517,255 A * 5/1985 Kanda ............. B32B 15/08
156/309.9
(Continued)

FOREIGN PATENT DOCUMENTS

CN 1032765 5/1989
CN 1033255 6/1989
(Continued)

OTHER PUBLICATIONS

Japanese Notice of Rejection dated Aug. 19, 2014 along with an English translation from corresponding Japanese Patent Application No. 2013-530952.
(Continued)

*Primary Examiner* — Vivian Chen
(74) *Attorney, Agent, or Firm* — DLA Piper LLP (US)

(57) ABSTRACT

A resin coated metal sheet includes a metal sheet, a first resin coating layer formed on one main surface of the metal sheet and formed of a resin material whose difference between a heat quantity of crystallization and a heat quantity of fusion after being laminated to the metal sheet is 6 J/g to 20 J/g on a unit weight basis, and a second resin coating layer formed on another main surface of the metal sheet.

9 Claims, 1 Drawing Sheet

(51) Int. Cl.

| | | |
|---|---|---|
| B32B 15/09 | (2006.01) | |
| B32B 27/18 | (2006.01) | |
| B32B 27/20 | (2006.01) | |
| B32B 27/36 | (2006.01) | |
| C09D 191/06 | (2006.01) | |
| C08L 67/02 | (2006.01) | |
| C08L 67/03 | (2006.01) | |
| C08L 91/06 | (2006.01) | |
| C08K 3/22 | (2006.01) | |
| C23C 28/00 | (2006.01) | |
| B32B 7/12 | (2006.01) | |
| B32B 15/00 | (2006.01) | |
| B32B 27/08 | (2006.01) | |
| B32B 1/02 | (2006.01) | |
| C08K 3/00 | (2006.01) | |

(52) U.S. Cl.
CPC ............. *C08L 91/06* (2013.01); *C09D 191/06* (2013.01); *Y10T 428/265* (2015.01); *Y10T 428/31678* (2015.04); *Y10T 428/31681* (2015.04); *Y10T 428/31786* (2015.04); *Y10T 428/31801* (2015.04)

(56) References Cited

U.S. PATENT DOCUMENTS

| | | | | |
|---|---|---|---|---|
| 5,059,460 A * | 10/1991 | Heyes | ........... | B32B 15/08 156/308.2 |
| 5,072,605 A * | 12/1991 | Imazu | ........... | B21D 51/26 72/347 |
| 5,093,208 A * | 3/1992 | Heyes | ........... | B32B 15/08 156/309.9 |
| 5,149,389 A * | 9/1992 | Heyes | ........... | B32B 15/08 156/272.4 |
| 5,179,854 A * | 1/1993 | Matsui | ........... | B21D 22/28 72/349 |
| 5,249,447 A * | 10/1993 | Aizawa | ........... | B21D 22/201 72/349 |
| 5,272,011 A * | 12/1993 | Tanaka | ........... | B32B 15/08 220/62.12 |
| 5,330,605 A * | 7/1994 | Tanaka | ........... | B32B 15/08 156/309.9 |
| 5,393,818 A * | 2/1995 | Masse | ........... | B32B 27/08 524/270 |
| 5,585,177 A * | 12/1996 | Okamura | ........... | B32B 15/08 220/62.22 |
| 5,736,086 A * | 4/1998 | Jones | ........... | B32B 15/08 264/171.17 |
| 5,957,820 A * | 9/1999 | Zarillo | ........... | A63B 21/026 482/121 |
| 6,025,056 A * | 2/2000 | Machii | ........... | B32B 15/08 428/204 |
| 8,808,844 B2 * | 8/2014 | Niederst | ........... | B32B 15/08 428/213 |
| 2003/0069387 A1* | 4/2003 | Majima | ........... | B32B 15/08 528/271 |
| 2003/0216496 A1* | 11/2003 | Mohanty | ........... | B29C 67/24 524/284 |
| 2005/0182201 A1* | 8/2005 | Matsumoto | ........... | C08J 5/18 525/418 |
| 2009/0186990 A1* | 7/2009 | Inui | ........... | C08J 5/18 525/411 |
| 2011/0220645 A1* | 9/2011 | Niederst | ........... | B32B 15/08 220/200 |

FOREIGN PATENT DOCUMENTS

| | | | |
|---|---|---|---|
| EP | 0 312 303 | | 4/1989 |
| EP | 0 312 304 | | 4/1989 |
| JP | 02-501638 | * | 6/1990 |
| JP | 2-501638 | A | 6/1990 |
| JP | 07-323259 | * | 12/1995 |
| JP | 07-323259 | A | 12/1995 |
| JP | 2526725 | B2 | 6/1996 |
| JP | 08-169098 | A | 7/1996 |
| JP | 08-193127 | * | 7/1996 |
| JP | 11-279294 | * | 10/1999 |
| JP | 2000-006967 | * | 1/2000 |
| JP | 2004-050502 | * | 2/2004 |
| JP | 2004-50502 | | 2/2004 |
| JP | 2004-130536 | A | 4/2004 |
| JP | 2004-148324 | A | 5/2004 |
| JP | 2005-288702 | * | 10/2005 |
| JP | 2005-288706 | * | 10/2005 |
| JP | 2006-212897 | * | 8/2006 |
| JP | 2007-44944 | | 2/2007 |
| JP | 2007-253453 | | 10/2007 |
| JP | 2007-260915 | * | 10/2007 |
| JP | 2010-017896 | * | 1/2010 |
| JP | 2010-17896 | | 1/2010 |

OTHER PUBLICATIONS

Corresponding Office Action of CN 201180073099.2 dated Oct. 28, 2014.
Supplementary European Search Report dated Feb. 5, 2015 from corresponding European Patent Application No. EP 11 87 1436.9.
Second Chinse Office Action dated Jun. 30, 2015 of corresponding Chinese Application No. 201180073099.2 along with a partial English translation.
Chinese Office Action dated Dec. 25, 2015 of corresponding Chinese Application No. 201180073099.2 along with an English translation.

* cited by examiner

RESIN COATED METAL SHEET

TECHNICAL FIELD

This disclosure relates to a resin coated metal sheet in which a metal sheet has resin coating layers on both sides thereof.

BACKGROUND

In general, metal containers are broadly divided into two-piece cans and three-piece cans. The two-piece can refers to a metal container consisting of two parts of a can body integral with a can bottom and a lid body. The three-piece can refers to a metal container consisting of three parts of a can barrel, an upper lid, and a bottom lid. Although the can body of the two-piece can has a fine appearance because it has no seamed part (welded part), it in general requires a high degree of working. In contrast, although the can barrel of the three-piece can is inferior in appearance as compared to the can body of the two-piece can because it has seamed parts, it does not in general require a high degree of working. Given these circumstances, there is a tendency that the two-piece cans are used for expensive small-volume metal containers and the three-piece cans are used for inexpensive large-volume metal containers.

Among the two-piece cans, as a metal material for a can body of a two-piece can that has a high degree of working in drawing and has a high degree of stretching in a can height direction, that is, a two-piece can having a high degree of working, a soft metal material such as aluminum, which is expensive and has a large sheet thickness, is used, and a steel sheet such as tinplate or tin-free steel, which is inexpensive and has a small sheet thickness, is little used. The reason is that while forming methods having a high degree of working such as the drawing method and the draw and ironing (DI) method are hard to be adopted to the steel sheet, the impact forming method having a high degree of working can be applied to the soft metal material. Examples of the two-piece can having a high degree of working include an aerosol can.

For a two-piece can having a low degree of working, technologies have been developed for manufacturing can bodies by the drawing method and the DI method using as a material a resin coated metal sheet in which a metal sheet has resin coating layers on both sides thereof (see Japanese Examined Patent Application Publication No. 7-106394, Japanese Patent No. 2526725 and Japanese Patent Application Laid-open No. 2004-148324). To allow treatment to improve the designability of a can body such as printing treatment, technologies have also been developed to add a white pigment to a resin coating layer positioned outside a metal container after forming (Japanese Patent Application Laid-open Nos. 8-169098 and 2004-130536).

We investigated whether a can body of a two-piece can having a high degree of working can be manufactured using a steel sheet that is inexpensive and has high strength despite of its small sheet thickness, a two-piece can having a high degree of working can be provided at a lower price. We then manufactured a can body of a two-piece can having a high degree of working using a resin coated metal sheet and performed heat treatment at a temperature close to the melting point of the resin coating layer to increase adhesion between the resin coating layer and a metal sheet after forming, the laminatability of the back side resin coating layer positioned inside a metal container after forming, and the designability of the front side resin coating layer positioned outside the metal container after forming. As a result, we found that a black-spot shaped pattern was formed on the front side resin coating layer after heat treatment and that appearance defects were caused by the heat treatment. Given this situation, to manufacture a can body of a two-piece can having a high degree of working using a resin coated metal sheet, it is required that no appearance defect is caused by heat treatment.

SUMMARY

We found that the appearance defects are caused by heat treatment because a residual stress within the resin coating layer that has developed during forming is relaxed by heat treatment and the resin coating layer becomes deformed unevenly to form uneven distribution of a pigment. Based on this finding, we further considered that the residual stress of the resin coating layer after forming can be reduced by controlling the degree of crystallinity of the resin coating layer, thereby reducing the uneven deformation of the resin coating layer and the occurrence of appearance defects caused by heat treatment.

Our resin coated metal sheet can include: a metal sheet, a first resin coating layer that is formed on onemain surface of the metal sheet and formed of a resin material whose difference between a heat quantity of crystallizaqtion and a heat quantity of fusion after being laminated to the metal sheet is within a range of 0 J/g to 20 J/g on a unit weight base; and a second resin coating layer formed on another main surface of the metal sheet.

The resin coated metal sheets can reduce the residual stress of the resin coating layer positioned outside a container after forming, thereby reducing the occurrence of appearance defects caused by heat treatment.

REFERENCE SIGNS LIST

1 Resin coated metal sheet
2 Metal sheet
3,4 Resin coating layer

DETAILED DESCRIPTION

The following describes a resin coated metal sheet with reference to the accompanying drawings.

Figure 1:
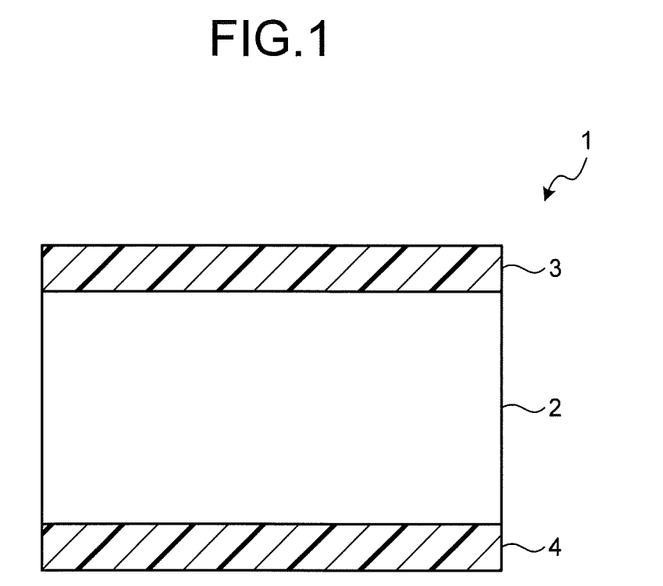
FIG. 1 is a sectional view illustrating the constitution of an example of our resin coated metal sheets.
Figure 2:
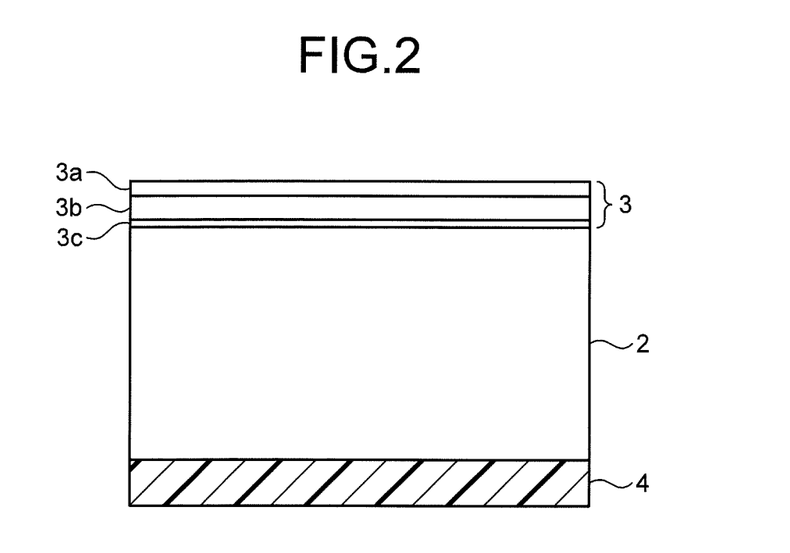
FIG. 2 is a sectional view illustrating the constitution of a modification to the resin coated metal sheet illustrated in FIG. 1.

FIG. 1 is a sectional view illustrating the constitution of one of our resin coated metal sheets. FIG. 2 is a sectional view illustrating the constitution of a modification to the resin coated metal sheet illustrated in FIG. 1. As illustrated in FIG. 1, this resin coated metal sheet 1 includes a metal sheet 2, a resin coating layer 3 formed on the front side of the metal sheet 2, and a resin coating layer 4 formed on the back side of the metal sheet 2. The resin coating layer 3 and the resin coating layer 4 are positioned outside and inside a metal container after forming, respectively.

The metal sheet 2 is formed of a steel sheet such as tinplate or tin-free steel. With regard to the tinplate, one having a plating amount of 0.5 to 15 g/m² may be used. The tin-free steel may have on its surface a chromium metal layer with an adhesion amount of 50 to 200 mg/m² and a chromium oxide layer with an adhesion amount of 3 to 30 mg/m² on a chromium metal layer basis. The steel sheet, which is not limited in particular in its type, so long as it can be formed into an intended shape, is preferably one based on the following components and manufacturing methods:

(1) One obtained by using low-carbon steel with a carbon (C) amount of about 0.01 to 0.10% and performing recrystallization annealing by box annealing.

(2) One obtained by using low-carbon steel with a C amount of about 0.01 to 0.10% and performing recrystallization annealing by continuous annealing.

(3) One obtained by using low-carbon steel with a C amount of about 0.01 to 0.10% and performing recrystallization annealing by continuous annealing and overaging treatment.

(4) One obtained by using low-carbon steel with a C amount of about 0.01 to 0.10% and performing recrystallization annealing by box annealing or continuous annealing, and then performing secondary cold rolling (double reduced (DR) rolling).

(5) One obtained by using interstitial free (IF) steel in which elements such as Nb and Ti interstitially fixing dissolved C are added to extra-low-carbon steel with a C amount of about 0.003% or less and performing recrystallization annealing by continuous annealing.

The mechanical property of the steel sheet is not limited in particular so long as the steel sheet can be formed into an intended shape, but to not impair workability and maintain sufficient can body strength, a steel sheet whose yield strength YP is about 220 MPa or more and 580 MPa or less is preferably used. With regard to the Lankford (r-value) as an indicator of plastic anisotropy, one with a value of 0.8 or more is preferable, and with regard to the intra-plane anisotropy $\Delta r$ of the r-value, one with its absolute value of 0.7 or less is preferable. The sheet thickness of the steel sheet can be appropriately set based on the shape of an intended can and necessary can body strength. In view of reducing an increase in the cost of the steel sheet and the can body, a steel sheet with a sheet thickness of about 0.15 to 0.4 mm is preferably used.

The resin coating layers 3 and 4 are formed of a resin material containing 90 mol % or more ethylene terephthalate unit, preferably 92 mol % or more. A resin material with ethylene terephthalate unit being less than 90 mol % is not preferable because the resin material is subjected to heat treatment at nearly the melting point after forming, which causes thermal degradation. Without impairing its heat resistance and workability, the resin material may be copolymerized with other components such as a dicarboxylic acid component and a glycol component. Examples of the dicarboxylic acid include: aromatic dicarboxylic acids such as isophthalic acid, naphthalene dicarboxylic acid, diphenyl dicarboxylic acid, diphenyl sulfone dicarboxylic acid, diphenoxyethane dicarboxylic acid, 5-sodium sulfoisophthalic acid, and phthalic acid; aliphatic dicarboxylic acids such as oxalic acid, succinic acid, adipic acid, sebacic acid, dimer acid, maleic acid, and fumaric acid; alicyclic dicarboxylic acid such as cyclohexane dicarboxylic acid; and oxycarboxylic acid such as p-oxybenzoic acid. Examples of the glycol component include: aliphatic glycols such as propanediol, butanediol, pentanediol, hexanediol, and neopentyl glycol; alicyclic glycol such as cyclohexane dimethanol; aromatic glycols such as bisphenol A and bisphenol S; and diethylene glycol. Two or more of these dicarboxylic acid components and the glycol components may be used in combination.

The resin material forming the resin coating layers 3 and 4 is not limited in its manufacturing method. The resin material can be manufactured by, for example, (1) a method in which terephthalic acid, ethylene glycol, and a copolymerization component are subjected to an esterification reaction, and then the resultant reaction product is polycondensed to obtain copolyester and (2) a method in which dimethyl terephthalate, ethylene glycol, and a copolymerization component are subjected to a transesterification reaction, and then the resultant reaction product is polycondensed to obtain copolyester. In manufacturing copolyester, additives such as fluorescent brightening agents, antioxidants, thermal stabilizers, UV absorbers, and antistatic agents may be added as needed. The addition of a fluorescent brightening agent is effective in improving whiteness.

The time period during which the resin coating layers 3 and 4 are held at a temperature of not less than their melting point during lamination to the metal sheet 2 is preferably within a range of 1 to 30 milliseconds. Pressing pressure during the lamination is not limited in particular, but the surface pressure is preferably within a range of 9.8 to 294 N (1 to 30 kgf/cm²). When the surface pressure is lower than this range, even when the temperature of the boundary surface between the metal sheet 2 and the resin coating layers 3 and 4 is not less than the melting point, the resin coating layers 3 and 4 melt insufficiently, because the time period during which the temperature is not less than the melting point is short, which may fail to achieve sufficient adhesion between the resin coating layers 3 and 4 and the metal sheet 2. When the surface pressure is higher than this range, the deposition of the resin coating layers 3 and 4 may occur. Melt extrusion lamination may be applied in which a melted resin material, instead of the film-like resin material, is laminated to the surface of the metal sheet 2.

The resin coating layer 3 is formed of a resin material whose difference between the heat quantity of crystallization and the heat quantity of fusion after being laminated to the metal sheet 2 is 0 J/g or more and 20 J/g or less, preferably 0 J/g or more and 18 J/g or less, and more preferably 0 J/g or more and 14 J/g or less, on a unit weight basis. The heat quantity of crystallization and the heat quantity of fusion can be measured using a differential scanning calorimetry (DSC). The difference between the heat quantity of crystallization and the heat quantity of fusion gives an indicator of the degree of crystallinity of the resin coating layer 3 after lamination. When the difference between the heat quantity of crystallization and the heat quantity of fusion is 0 J/g, the resin coating layer 3 is in an amorphous state, the degree of crystallinity of the resin coating layer 3 is nearly zero, and a residual stress after forming is low. For this reason, no appearance defect is caused by heat treatment. When the difference between the heat quantity of crystallization and the heat quantity of fusion exceeds 20 J/g, the degree of crystallinity of the resin coating layer 3 is high, and the residual stress after forming is high. For this reason, appearance defects are caused by heat treatment.

The degree of crystallinity of the resin coating layer 3 can be controlled by controlling the degree of orientation and melting point of the resin coating layer 3 before lamination and lamination conditions (steel sheet heating temperature, nip pressure, time until water cooling after lamination, cooling temperature after lamination, and line speed). Specifically, by increasing the heating temperature of the metal sheet 2 during lamination, the degree of crystallinity of the resin coating layer 3 can be reduced. The heating temperature of the metal sheet 2, which differs by the melting point and degree of crystallinity before lamination of the resin coating layer 3, is higher than the melting point of the resin coating layer 3 by 10 to 50° C. By reducing the nip pressure, the cooling effect of the resin coating layer 3 by the nip is reduced, thereby reducing the degree of crystallinity of the resin coating layer 3. By reducing the time until water cooling after lamination, the crystallization of the resin coating layer 3 during the cooling process after lamination can be reduced, thereby reducing the degree of crystallinity of the resin coating layer 3. The time until water cooling after lamination, which depends on a line speed, is 0.5 seconds to 10 seconds. By increasing the line speed, the degree of crystallinity of the resin coating layer 3 can be reduced even under the same conditions as to heating roll temperature. This is because the influence of natural cooling or the like after it is heated until it is laminated diminishes.

The melting point of the resin coating layer 3 is 240° C. or more and 254° C. or less, preferably 242° C. or more and 252° C. or less, and more preferably 244° C. or more and 250° C. or less. When the melting point of the resin coating layer 3 is less than 240° C., the resin coating layer 3 is likely to soften through surface sliding during working, the working heat generation of the metal sheet 2 or the like, which may lead to the occurrence of a scrape on the surface of the resin coating layer 3 or the breakage thereof. When the melting point of the resin coating layer 3 exceeds 254° C., the degree of crystallinity of the resin coating layer 3 increases, and it may fail to allow working at a high degree of working.

It is preferable that the intrinsic viscosity (IV) of the resin coating layer 3 is 0.55 dl/g or more and 0.90 dl/g or less, preferably 0.58 dl/g or more and 0.80 dl/g or less, and more preferably 0.59 dl/g or more and 0.78 dl/g or less. When the intrinsic viscosity of the resin coating layer 3 is less than 0.55 dl/g, the melt viscosity of the resin coating layer 3 is low, thereby making uneven deformation of the resin coating layer 3 likely to occur during heat treatment. When the intrinsic viscosity of the resin coating layer 3 exceeds 0.90 dl/g, film formability degrades. The intrinsic viscosity (IV) of a laminated resin can be adjusted by changes in polymerization conditions (polymerization catalyst amount, polymerization temperature, polymerization time, or the like) and the solid phase polymerization method in an inert gas atmosphere such as nitrogen or in a vacuum following melt polymerization.

The resin coating layer 3 is required to be white to allow treatment to improve designability such as printing treatment. For this reason, the resin coating layer 3 preferably contains titanium oxide in an amount of 8 wt % or more and 30 wt % or less, preferably 10 wt % or more and 25 wt % or less, and more preferably 12 wt % or more and 20 wt % or less. When the content of the titanium oxide is less than 8 wt %, sufficient whiteness cannot be ensured after working. When the content of the titanium oxide exceeds 30 wt %, forming at a high degree of working causes problems with the adhesion between the metal sheet 2 and the resin coating layer 3 and workability.

With regard to titanium oxide added to the resin coating layer 3, which is not limited in particular, one whose purity of rutile type titanium oxide is 90% or more is preferably used. When the purity of rutile type titanium oxide is less than 90%, the dispersibility of titanium oxide is poor when it is mixed with the resin material, which may result in a reduced molecular weight of the resin material. A method of adding titanium oxide may use various methods listed in (1) to (3) below. When adding titanium oxide using the method (1), titanium oxide is preferably added to a reaction system as slurry dispersed in glycol. The thickness of the resin coating layer 3 with titanium oxide added is preferable to be 10 to 40 μm, preferably 12 to 35 μm, and more preferably 15 to 25 μm to ensure the whiteness after working. When the thickness of the resin coating layer 3 is less than 10 μm, cracking is likely to develop in the resin coating layer 3 during working. The thickness of the resin coating layer 3 exceeding 40 μm gives excessive quality, which is uneconomical.

(1) A method in which titanium oxide is added before the termination of the transesterification reaction or the esterification reaction or before the start of the polycondensation reaction in the synthesis of copolyester;

(2) A method in which titanium oxide is added to copolyester and melt kneading is performed; and (3) A method in which in the methods (1) and (2), master pellets to which a large amount of titanium oxide is added are manufactured and kneaded with copolyester that contains no particle, to allow a predetermined amount of titanium oxide to be contained.

As illustrated in FIG. 2, the resin coating layer 3 may have a three-layer structure of an outermost layer (an upper layer) 3a, an intermediate layer 3b, and a lowermost layer (a lower layer) 3c. In this case, the film thickness of the outermost layer 3a and the lowermost layer 3c may be 1 μm or more and 5 μm or less, preferably 1.5 μm or more and 4 μm or less, and more preferably 2 μm or more and 3 μm or less, and the film thickness of the intermediate layer 3b may be 6 μm or more and 30 μm or less, preferably 8 μm or more and 25 μm or less, and more preferably 10 μm or more and 20 μm or less. The outermost layer 3a and the lowermost layer 3c may contain titanium oxide in an amount of 0 wt % or more and 2 wt % or less, and the intermediate layer 3b may contain titanium oxide in an amount of 10 wt % or more and 30 wt % or less.

When the film thickness of the outermost layer 3a and the lowermost layer 3c is less than 1 μm, a scrape develops in the resin coating layer 3, or the luster of the surface of the resin coating layer 3 cannot be ensured sufficiently. When the film thickness of the outermost layer 3a and the lowermost layer 3c exceeds 5 μm, it is required to increase the film thickness of the intermediate layer 3b containing titanium oxide or increase the content of titanium oxide to ensure the whiteness, which is unfavorable in economy and workability. It is preferable that the difference in the melting points among the outermost layer 3a, the intermediate layer 3b, and the lowermost layer 3c is 10° C. or less, preferably 6° C. or less, and more preferably 3° C. or less. When the difference in the melting points among the layers exceeds 10° C., appearance defects are likely to be caused by uneven displacement (flowing), because the melted state differs significantly between the layers because of heat treatment.

To reduce the occurrence of a scrape and breakage in the resin coating layer 3 during forming at a high degree of working, a wax component may be applied or added to the resin coating layer 3. With regard to the wax component to be applied or added, which is not limited in particular, organic lubricants and inorganic lubricants can be applied. When the wax component is applied to the resin coating layer 3, preferably used are aliphatic waxes having a melting point of 30° C. or more such as straight-chain aliphatic series such as paraffin and fatty acid esters. When the wax component is added to the resin coating layer 3, preferably used are fatty acids and fatty acid esters such as stearic acid, stearate, palmitic acid, and palmitate, which are favorable in compatibility with a polyester resin.

The application amount of the wax component is preferably 20 to 80 mg/m$^2$. When the application amount of the wax component is less than 20 mg/m$^2$, the lubricating effect reduces, which is unfavorable. When the application amount of the wax component exceeds 80 mg/m$^2$, the wax component is excessive, and the wax component remains as a solid content in a mold in the manufacture of cans, thereby inhibiting can manufacturability. The addition amount of the wax component is preferably 0.01 wt % to 5 wt %. When the addition amount of the wax component is less than 0.01 wt %, the lubricating effect reduces, which is unfavorable. When the addition amount of the wax component exceeds 5 wt %, transfer of the wax component or the like occurs when the resin coating layer 3 is wound in a roll shape, which will be problematic.

The resin coating layer 4 is preferably formed of a resin material whose difference between the heat quantity of crystallization and the heat quantity of fusion after being laminated to the metal sheet 2 is 0 J/g or more and 10 J/g or less on a unit weight basis. When the difference between the heat quantity of crystallization and the heat quantity of fusion is 0 J/g, the resin coating layer 4 is in an amorphous state, the degree of crystallinity of the resin coating layer 4 is nearly zero, and a residual stress after forming also reduces. When the difference between the heat quantity of crystallization and the heat quantity of fusion exceeds 10 J/g, the degree of crystallinity of the resin coating layer 4 is high, and the residual stress after forming is high. For this reason, cracking develops in the resin coating layer 4, thereby degrading corrosion resistance. The degree of crystallinity of the resin coating layer 4, in the same manner as the crystallinity of the resin coating layer 3, can be controlled by controlling the degree of orientation and melting point of the resin coating layer 4 before lamination and lamination conditions (temperature, nip pressure, and cooling time and temperature).

The resin coating layer 4 is preferably formed of a resin material having a melting point lower than the melting point of the resin coating layer 3 by 4° C. or more and 20° C. or less, preferably 6° C. or more and 14° C. or less. When the melting point of the resin coating layer 4 is lower than the melting point of the resin coating layer 3 by less than 4° C., the resin coating layer 4 does not melt sufficiently through heat treatment after working, thereby resulting in imperfect repair of minute physical flaws or the like along with working. When the melting point of the resin coating layer 4 is lower than the melting point of the resin coating layer 3 by more than 20° C., the resin coating layer 4 melts excessively through heat treatment after working, causing thermal degradation to impair laminatability.

EXAMPLES

Using T3CA TFS (tin free steel, Cr metal layer: 120 mg/m$^2$, Cr oxide layer: 10 mg/m$^2$ on a Cr metal basis) with a thickness of 0.23 mm as a metal sheet, the resin coating layers of Examples 1 to 23 and Comparative Examples 1 to 10 listed in Tables 1 to 3 below were formed on both sides of the metal sheet using the film laminate method (the film thermocompression bonding method). Specifically, with the metal sheet heated to a temperature higher than the melting point of the resin coating layer by 20° C., the film-shaped resin coating layer prepared by the biaxial drawing method using nip rolls was thermocompressed onto the metal sheet and then cooled through water cooling of 5 seconds or less, thereby applying the resin coating layers to both sides of the metal sheet. A resin coating layer (an outer resin layer) containing a white pigment was laminated to the front side of the metal sheet positioned outside a container after forming, and a resin coating layer (an inner resin layer) containing no white pigment was laminated to the back side of the metal sheet positioned inside the container. For the obtained resin coated metal sheet, measured were the adhesion amount of a wax component (a wax application amount), the intrinsic viscosity (IV) of the resin coating layer, the melting point of the resin coating layer, the heat quantity of crystallization of the resin coating layer, and the heat quantity of fusion of the resin coating layer, using the methods listed below. For the outer resin layer, its whiteness was measured. The measurement results are listed in Tables 1 to 3 below.

(1) Adhesion Amount of Wax Component

Measured were the weights of the resin coated metal sheet before the application and after the application of the wax component, to calculate the weight difference of the resin coated metal sheet between before and after the application of the wax component, as the adhesion amount of the wax component.

(2) Intrinsic Viscosity (IV)

A measurement was carried out by the method listed in JIS K7367-5 and with a concentration of 0.005 g/ml in o-chlorophenol at 35° C. to determine the intrinsic viscosity by a formula: intrinsic viscosity=$(T-T_0)/(T_0 \times c)$. In the formula, c denotes a concentration representing a resin concentration per 100 ml of a solution in terms of the number of grams, and $T_0$ and T denote the times of flow of a solvent and a resin solution, respectively, within a capillary type viscometer.

(3) Melting Point of Resin Coating Layer

Using a differential scanning calorimetry apparatus, measured was an endothermic peak when the temperature of the resin coating layer before lamination was raised from room temperature to 290° C. at a rate of temperature rise of 10° C./min, to determine the peak temperature of the endothermic peak measured at 200 to 280° C. as the melting point of the resin coating layer.

(4) Heat Quantity of Crystallization and Heat Quantity of Fusion

The resin coating layer was removed from the resin coated metal sheet with diluted hydrochloric acid, and washed sufficiently with distilled water to dry. Using a differential scanning calorimetry apparatus, measured was an exothermic peak and an endothermic peak when the temperature of the resin coating layer was raised from −50° C. to 290° C. at a rate of temperature rise of 10° C./min. The heat quantity of crystallization was calculated from the area of the exothermic peak measured at 100 to 200° C., and the heat quantity of fusion was calculated from the area of the endothermic peak measured at 200 to 280° C. For the outer resin layer, with a weight excluding the content of titanium oxide as a resin amount, the heat quantity of crystallization and the heat quantity of fusion per unit resin weight were calculated.

(5) Whiteness

Using a spectral color difference meter, the whiteness of the resin coating layer 3 of the resin coated metal sheet was evaluated by the method listed in JIS 28722. The L-value of the Hunter Lab values measured under observation conditions with a measurement area of 30 mm dia., a measurement light source of C condition, and a field of view of 2° with respect to the measurement light source was determined to be the whiteness.

TABLE 1

| | Outer resin layer Upper layer | | | | | | | | |
|---|---|---|---|---|---|---|---|---|---|
| | Main component [mol %] | Another component [mol %] | Melting point [° C.] | TiO2 amount [wt %] | Film thickness [µm] | Wax type | Wax application amount [mg/m2] | Added wax type | Wax addition amount [wt %] |
| Example 1 | — | — | — | — | — | — | — | — | — |
| Example 2 | Ethylene terephthalate 94 | Ethylene isophthalate 6 | 240 | 5 | 2 | — | — | — | — |
| Example 3 | Ethylene terephthalate 98 | Ethylene isophthalate 2 | 254 | 0 | 2 | — | — | — | — |
| Example 4 | Ethylene terephthalate 96 | Ethylene isophthalate 4 | 247 | 0 | 2 | — | — | — | — |
| Example 5 | Ethylene terephthalate 96 | Ethylene isophthalate 4 | 247 | 0 | 2 | Paraffin wax | 40 mg/m2 | — | — |
| Example 6 | Ethylene terephthalate 98 | Ethylene isophthalate 2 | 254 | 0 | 2 | Paraffin wax | 40 mg/m2 | — | — |
| Example 7 | Ethylene terephthalate 96 | Ethylene isophthalate 4 | 247 | 0 | 2 | Paraffin wax | 40 mg/m2 | — | — |
| Example 8 | Ethylene terephthalate 96 | Ethylene isophthalate 4 | 247 | 0 | 2 | Paraffin wax | 60 mg/m2 | — | — |
| Example 9 | Ethylene terephthalate 96 | Ethylene isophthalate 4 | 247 | 0 | 2 | Paraffin wax | 40 mg/m2 | — | — |
| Example 10 | Ethylene terephthalate 96 | Ethylene isophthalate 4 | 247 | 0 | 2 | Paraffin wax | 40 mg/m2 | — | — |
| Example 11 | Ethylene terephthalate 96 | Ethylene isophthalate 4 | 247 | 0 | 2 | Paraffin wax | 40 mg/m2 | — | — |
| Example 12 | Ethylene terephthalate 97 | Cyclohexane dimethylene terephthalate 3 | 246 | 0 | 2 | Paraffin wax | 40 mg/m2 | — | — |
| Example 13 | Ethylene terephthalate 96 | Ethylene isophthalate 4 | 247 | 0 | 1 | Paraffin wax | 40 mg/m2 | — | — |
| Example 14 | Ethylene terephthalate 96 | Ethylene isophthalate 4 | 247 | 0 | 5 | Paraffin wax | 40 mg/m2 | — | — |
| Example 15 | Ethylene terephthalate 96 | Ethylene isophthalate 4 | 247 | 0 | 5 | Paraffin wax | 40 mg/m2 | Stearic acid | 0.1 |
| Example 16 | Ethylene terephthalate 96 | Ethylene isophthalate 4 | 247 | 0 | 5 | Paraffin wax | 40 mg/m2 | Stearic acid | 2 |
| Example 17 | Ethylene terephthalate 96 | Ethylene isophthalate 4 | 247 | 0 | 5 | Paraffin wax | 40 mg/m2 | Stearic acid | 5 |
| Example 18 | Ethylene terephthalate 96 | Ethylene isophthalate 4 | 247 | 0 | 5 | Paraffin wax | 40 mg/m2 | Stearic acid | 1.5 |
| Example 19 | Ethylene terephthalate 96 | Ethylene isophthalate 4 | 247 | 0 | 5 | Paraffin wax | 40 mg/m2 | | — |
| Example 20 | Ethylene terephthalate 96 | Ethylene isophthalate 4 | 247 | 0 | 5 | Paraffin wax | 40 mg/m2 | — | — |
| Example 21 | Ethylene terephthalate 96 | Ethylene isophthalate 4 | 247 | 0 | 1 | Paraffin wax | 40 mg/m2 | — | — |
| Example 22 | Ethylene terephthalate 96 | Ethylene isophthalate 4 | 247 | 0 | 2 | Paraffin wax | 40 mg/m2 | — | — |
| Example 23 | Ethylene terephthalate 96 | Ethylene isophthalate 4 | 247 | 0 | 2 | Butyl stearate | 40 mg/m2 | — | — |

| | Outer resin layer | | | | | | | | |
|---|---|---|---|---|---|---|---|---|---|
| | Intermediate layer | | | | | Lower layer | | | |
| | Main component [mol %] | Another component [mol %] | Melting point [° C.] | TiO2 amount [wt %] | Film thickness [µm] | Main component [mol %] | Another component [mol %] | Melting point [° C.] | TiO2 amount [wt %] | Film thickness [µm] |
| Example 1 | Ethylene terephthalate 89 | Ethylene isophthalate 11 | 230 | 20 | 20 | — | — | — | — | — |
| Example 2 | Ethylene terephthalate 94 | Ethylene isophthalate 6 | 240 | 25 | 18 | Ethylene terephthalate 94 | Ethylene isophthalate 6 | 240 | 5 | 2 |
| Example 3 | Ethylene terephthalate 98 | Ethylene isophthalate 2 | 254 | 25 | 18 | Ethylene terephthalate 98 | Ethylene isophthalate 2 | 254 | 0 | 2 |
| Example 4 | Ethylene terephthalate 96 | Ethylene isophthalate 4 | 247 | 20 | 18 | Ethylene terephthalate 96 | Ethylene isophthalate 4 | 247 | 0 | 2 |
| Example 5 | Ethylene terephthalate 96 | Ethylene isophthalate 4 | 247 | 20 | 18 | Ethylene terephthalate 96 | Ethylene isophthalate 4 | 247 | 0 | 2 |
| Example 6 | Ethylene terephthalate 95 | Ethylene isophthalate 5 | 244 | 20 | 18 | Ethylene terephthalate 98 | Ethylene isophthalate 2 | 254 | 0 | 2 |
| Example 7 | Ethylene terephthalate 96 | Ethylene isophthalate 4 | 247 | 20 | 18 | Ethylene terephthalate 96 | Ethylene isophthalate 4 | 247 | 0 | 2 |
| Example 8 | Ethylene terephthalate 96 | Ethylene isophthalate 4 | 247 | 20 | 18 | Ethylene terephthalate 96 | Ethylene isophthalate 4 | 247 | 0 | 2 |

TABLE 1-continued

| | | | | | | | | | | | |
|---|---|---|---|---|---|---|---|---|---|---|---|
| Example 9 | Ethylene terephthalate 96 | Ethylene isophthalate 4 | 247 | 9 | 38 | Ethylene terephthalate 96 | Ethylene isophthalate 4 | 247 | 0 | 2 | |
| Example 10 | Ethylene terephthalate 96 | Ethylene isophthalate 4 | 247 | 20 | 16 | Ethylene terephthalate 96 | Ethylene isophthalate 4 | 247 | 0 | 2 | |
| Example 11 | Ethylene terephthalate 96 | Ethylene isophthalate 4 | 247 | 20 | 18 | Ethylene terephthalate 96 | Ethylene isophthalate 4 | 247 | 0 | 2 | |
| Example 12 | Ethylene terephthalate 97 | Cyclohexane dimethylene terephthalate 3 | 246 | 20 | 18 | Ethylene terephthalate 97 | Cyclohexane dimethylene terephthalate 3 | 246 | 0 | 2 | |
| Example 13 | Ethylene terephthalate 96 | Ethylene isophthalate 4 | 247 | 20 | 18 | Ethylene terephthalate 96 | Ethylene isophthalate 4 | 247 | 0 | 1 | |
| Example 14 | Ethylene terephthalate 96 | Ethylene isophthalate 4 | 247 | 25 | 10 | Ethylene terephthalate 96 | Ethylene isophthalate 4 | 247 | 0 | 5 | |
| Example 15 | Ethylene terephthalate 96 | Ethylene isophthalate 4 | 247 | 25 | 10 | Ethylene terephthalate 96 | Ethylene isophthalate 4 | 247 | 0 | 5 | |
| Example 16 | Ethylene terephthalate 96 | Ethylene isophthalate 4 | 247 | 25 | 10 | Ethylene terephthalate 96 | Ethylene isophthalate 4 | 247 | 0 | 5 | |
| Example 17 | Ethylene terephthalate 96 | Ethylene isophthalate 4 | 247 | 20 | 10 | Ethylene terephthalate 96 | Ethylene isophthalate 4 | 247 | 0 | 5 | |
| Example 18 | Ethylene terephthalate 96 | Ethylene isophthalate 4 | 247 | 25 | 10 | Ethylene terephthalate 96 | Ethylene isophthalate 4 | 247 | 0 | 5 | |
| Example 19 | Ethylene terephthalate 96 | Ethylene isophthalate 4 | 247 | 25 | 10 | Ethylene terephthalate 96 | Ethylene isophthalate 4 | 247 | 0 | 5 | |
| Example 20 | Ethylene terephthalate 96 | Ethylene isophthalate 4 | 247 | 20 | 30 | Ethylene terephthalate 96 | Ethylene isophthalate 4 | 247 | 0 | 5 | |
| Example 21 | Ethylene terephthalate 96 | Ethylene isophthalate 4 | 247 | 20 | 8 | Ethylene terephthalate 96 | Ethylene isophthalate 4 | 247 | 0 | 1 | |
| Example 22 | Ethylene terephthalate 96 | Ethylene isophthalate 4 | 247 | 20 | 8 | Ethylene terephthalate 96 | Ethylene isophthalate 4 | 247 | 0 | 2 | |
| Example 23 | Ethylene terephthalate 96 | Ethylene isophthalate 4 | 247 | 20 | 18 | Ethylene terephthalate 96 | Ethylene isophthalate 4 | 247 | 0 | 2 | |

| | Outer resin layer | | | | | | | |
|---|---|---|---|---|---|---|---|---|
| | TiO2 as entire film [wt %] | Total film thickness [μm] | Melting point difference among layers | Heat quantity of crystallization [J/g] | Heat quantity of fusion [J/g] | Heat quantity difference [J/g] | IV | Whiteness |
| Example 1 | 20.0 | 20 | — | 23 | 30 | 7 | 0.60 | 84 |
| Example 2 | 21.4 | 22 | 0 | 27 | 36 | 9 | 0.62 | 84 |
| Example 3 | 20.5 | 22 | 0 | 32 | 42 | 10 | 0.64 | 84 |
| Example 4 | 16.4 | 22 | 0 | 32 | 38 | 6 | 0.60 | 82 |
| Example 5 | 16.4 | 22 | 0 | 18 | 38 | 20 | 0.60 | 82 |
| Example 6 | 16.4 | 22 | 10 | 32 | 40 | 8 | 0.61 | 82 |
| Example 7 | 16.4 | 22 | 0 | 30 | 38 | 8 | 0.55 | 82 |
| Example 8 | 16.4 | 22 | 0 | 30 | 38 | 8 | 0.90 | 82 |
| Example 9 | 8.1 | 42 | 0 | 30 | 38 | 8 | 0.61 | 78 |
| Example 10 | 16.0 | 20 | 0 | 30 | 38 | 8 | 0.62 | 80 |
| Example 11 | 16.4 | 22 | 0 | 20 | 38 | 18 | 0.63 | 82 |
| Example 12 | 16.4 | 22 | 0 | 32 | 40 | 8 | 0.62 | 82 |
| Example 13 | 18.0 | 20 | 0 | 30 | 38 | 8 | 0.60 | 83 |
| Example 14 | 12.5 | 20 | 0 | 30 | 38 | 8 | 0.63 | 80 |
| Example 15 | 12.5 | 20 | 0 | 30 | 38 | 8 | 0.63 | 80 |
| Example 16 | 12.5 | 20 | 0 | 30 | 38 | 8 | 0.63 | 80 |
| Example 17 | 10.0 | 20 | 0 | 30 | 38 | 8 | 0.63 | 79 |
| Example 18 | 12.5 | 20 | 0 | 30 | 38 | 8 | 0.63 | 80 |
| Example 19 | 12.5 | 20 | 0 | 30 | 38 | 8 | 0.63 | 80 |
| Example 20 | 15.0 | 40 | 0 | 30 | 38 | 8 | 0.60 | 82 |
| Example 21 | 16.0 | 10 | 0 | 30 | 38 | 8 | 0.60 | 82 |
| Example 22 | 13.3 | 12 | 0 | 30 | 38 | 8 | 0.60 | 82 |
| Example 23 | 16.4 | 22 | 0 | 18 | 38 | 20 | 0.60 | 82 |

TABLE 2

| | Outer resin layer Upper layer | | | | | | | | |
|---|---|---|---|---|---|---|---|---|---|
| | Main component [mol %] | Another component [mol %] | Melting point [° C.] | TiO2 amount [wt %] | Film thickness μm | Wax type | Wax application amount [mg/m2] | Added wax type | Wax addition amount [wt %] |
| Comparative Example 1 | Ethylene terephthalate 92 | Ethylene isophthalate 8 | 238 | 0 | 2 | Paraffin wax | 40 mg/m2 | — | — |
| Comparative Example 2 | Ethylene terephthalate 100 | 0 | 256 | 0 | 2 | Paraffin wax | 40 mg/m2 | — | — |

TABLE 2-continued

| | Main component | Another component | Melting point [°C.] | | | | | | |
|---|---|---|---|---|---|---|---|---|---|
| Comparative Example 3 | Ethylene terephthalate 96 | Ethylene isophthalate 4 | 247 | 0 | 2 | Paraffin wax | 40 mg/m2 | — | — |
| Comparative Example 4 | Ethylene terephthalate 96 | Ethylene isophthalate 4 | 247 | 0 | 2 | Paraffin wax | 40 mg/m2 | — | — |
| Comparative Example 5 | Ethylene terephthalate 91 | Ethylene isophthalate 9 | 238 | 0 | 2 | Paraffin wax | 40 mg/m2 | — | — |
| Comparative Example 6 | Ethylene terephthalate 98 | Ethylene isophthalate 2 | 254 | 0 | 2 | Paraffin wax | 40 mg/m2 | — | — |
| Comparative Example 7 | Ethylene terephthalate 96 | Ethylene isophthalate 4 | 247 | 0 | 2 | Paraffin wax | 40 mg/m2 | — | — |
| Comparative Example 8 | Ethylene terephthalate 96 | Ethylene isophthalate 4 | 247 | 0 | 2 | Paraffin wax | 40 mg/m2 | Stearic acid | 0.01 |
| Comparative Example 9 | Ethylene terephthalate 96 | Ethylene isophthalate 4 | 247 | 0 | 2 | Paraffin wax | 19 mg/m2 | — | — |
| Comparative Example 10 | Ethylene terephthalate 96 | Ethylene isophthalate 4 | 247 | 0 | 0.9 | Paraffin wax | 40 mg/m2 | — | — |

| | Outer resin layer | | | | | | | | |
|---|---|---|---|---|---|---|---|---|---|
| | Intermediate layer | | | | | Lower layer | | | |
| | Main component [mol %] | Another component [mol %] | Melting point [°C.] | TiO2 amount [wt %] | Film thickness [μm] | Main component [mol %] | Another component [mol %] | Melting point [°C.] | TiO2 amount [wt %] | Film thickness [μm] |
| Comparative Example 1 | Ethylene terephthalate 90 | Ethylene isophthalate 10 | 238 | 20 | 18 | Ethylene terephthalate 92 | Ethylene isophthalate 8 | 238 | 0 | 2 |
| Comparative Example 2 | Ethylene terephthalate 100 | 0 | 258 | 20 | 18 | Ethylene terephthalate 100 | 0 | 256 | 0 | 2 |
| Comparative Example 3 | Ethylene terephthalate 96 | Ethylene isophthalate 4 | 247 | 20 | 18 | Ethylene terephthalate 96 | Ethylene isophthalate 4 | 247 | 0 | 2 |
| Comparative Example 4 | Ethylene terephthalate 91 | Ethylene isophthalate 9 | 236 | 20 | 18 | Ethylene terephthalate 96 | Ethylene isophthalate 4 | 247 | 0 | 2 |
| Comparative Example 5 | Ethylene terephthalate 91 | Ethylene isophthalate 9 | 236 | 20 | 18 | Ethylene terephthalate 91 | Ethylene isophthalate 9 | 238 | 0 | 2 |
| Comparative Example 6 | Ethylene terephthalate 98 | Ethylene isophthalate 2 | 254 | 20 | 18 | Ethylene terephthalate 98 | Ethylene isophthalate 2 | 254 | 0 | 2 |
| Comparative Example 7 | Ethylene terephthalate 96 | Ethylene isophthalate 4 | 247 | 20 | 18 | Ethylene terephthalate 96 | Ethylene isophthalate 4 | 247 | 0 | 2 |
| Comparative Example 8 | Ethylene terephthalate 96 | Ethylene isophthalate 4 | 247 | 20 | 18 | Ethylene terephthalate 96 | Ethylene isophthalate 4 | 247 | 0 | 2 |
| Comparative Example 9 | Ethylene terephthalate 96 | Ethylene isophthalate 4 | 247 | 20 | 18 | Ethylene terephthalate 96 | Ethylene isophthalate 4 | 247 | 0 | 2 |
| Comparative Example 10 | Ethylene terephthalate 96 | Ethylene isophthalate 4 | 247 | 8 | 8 | Ethylene terephthalate 96 | Ethylene isophthalate 4 | 247 | 0 | 0.9 |

| | Outer resin layer | | | | | | | |
|---|---|---|---|---|---|---|---|---|
| | TiO2 as entire film [wt %] | Total film thickness [μm] | Melting point difference among layers | Heat quantity of crystallization [J/g] | Heat quantity of fusion [J/g] | Heat quantity difference [J/g] | IV | Whiteness |
| Comparative Example 1 | 16.4 | 22 | 0 | 11 | 36 | 25 | 0.63 | 82 |
| Comparative Example 2 | 16.4 | 22 | 0 | 20 | 42 | 22 | 0.63 | 82 |
| Comparative Example 3 | 16.4 | 22 | 0 | 16 | 38 | 22 | 0.63 | 82 |
| Comparative Example 4 | 16.4 | 22 | 11 | 16 | 37 | 21 | 0.63 | 82 |
| Comparative Example 5 | 16.4 | 22 | 2 | 15 | 36 | 21 | 0.63 | 82 |
| Comparative Example 6 | 16.4 | 22 | 0 | 21 | 45 | 24 | 0.63 | 82 |
| Comparative Example 7 | 16.4 | 22 | 0 | 16 | 38 | 22 | 0.54 | 82 |
| Comparative Example 8 | 16.4 | 22 | 0 | 16 | 38 | 22 | 0.63 | 82 |
| Comparative Example 9 | 16.4 | 22 | 0 | 16 | 38 | 22 | 0.63 | 82 |
| Comparative Example 10 | 6.5 | 9.8 | 0 | 15 | 38 | 23 | 0.60 | 74 |

TABLE 3

| | Inner resin layer | | | |
|---|---|---|---|---|
| | PET [mol %] | Another component [mol %] | Melting point [° C.] | Film thickness [μm] |
| Example 1 | Ethylene terephthalate 86 | Ethylene isophthalate 14 | 223 | 20 |
| Example 2 | Ethylene terephthalate 91 | Ethylene isophthalate 9 | 236 | 20 |
| Example 3 | Ethylene terephthalate 91 | Ethylene isophthalate 9 | 236 | 20 |
| Example 4 | Ethylene terephthalate 90 | Ethylene isophthalate 10 | 234 | 20 |
| Example 5 | Ethylene terephthalate 94 | Ethylene isophthalate 6 | 240 | 20 |
| Example 6 | Ethylene terephthalate 92 | Ethylene isophthalate 8 | 238 | 20 |
| Example 7 | Ethylene terephthalate 92 | Ethylene isophthalate 8 | 238 | 20 |
| Example 8 | Ethylene terephthalate 92 | Ethylene isophthalate 8 | 238 | 20 |
| Example 9 | Ethylene terephthalate 92 | Ethylene isophthalate 8 | 238 | 20 |
| Example 10 | Ethylene terephthalate 92 | Ethylene isophthalate 8 | 238 | 20 |
| Example 11 | Ethylene terephthalate 90 | Ethylene isophthalate 10 | 234 | 20 |
| Example 12 | Ethylene terephthalate 94 | Ethylene isophthalate 6 | 240 | 20 |
| Example 13 | Ethylene terephthalate 94 | Ethylene isophthalate 6 | 240 | 20 |
| Example 14 | Ethylene terephthalate 94 | Ethylene isophthalate 6 | 240 | 20 |
| Example 15 | Ethylene terephthalate 94 | Ethylene isophthalate 6 | 240 | 20 |
| Example 16 | Ethylene terephthalate 94 | Ethylene isophthalate 6 | 240 | 20 |
| Example 17 | Ethylene terephthalate 94 | Ethylene isophthalate 6 | 240 | 20 |
| Example 18 | Ethylene terephthalate 94 | Ethylene isophthalate 6 | 240 | 20 |
| Example 19 | Ethylene terephthalate 94 | Ethylene isophthalate 6 | 240 | 10 |
| Example 20 | Ethylene terephthalate 94 | Ethylene isophthalate 6 | 240 | 10 |
| Example 21 | Ethylene terephthalate 94 | Ethylene isophthalate 6 | 240 | 20 |
| Example 22 | Ethylene terephthalate 94 | Ethylene isophthalate 6 | 240 | 20 |
| Example 23 | Ethylene terephthalate 94 | Ethylene isophthalate 6 | 240 | 20 |
| Comparative Example 1 | Ethylene terephthalate 90 | Ethylene isophthalate 10 | 234 | 20 |
| Comparative Example 2 | Ethylene terephthalate 96 | Ethylene isophthalate 4 | 247 | 20 |
| Comparative Example 3 | Ethylene terephthalate 90 | Ethylene isophthalate 10 | 234 | 20 |
| Comparative Example 4 | Ethylene terephthalate 90 | Ethylene isophthalate 10 | 234 | 20 |
| Comparative Example 5 | Ethylene terephthalate 90 | Ethylene isophthalate 10 | 234 | 20 |
| Comparative Example 6 | Ethylene terephthalate 89 | Ethylene isophthalate 11 | 232 | 20 |
| Comparative Example 7 | Ethylene terephthalate 90 | Ethylene isophthalate 10 | 234 | 20 |
| Comparative Example 8 | Ethylene terephthalate 90 | Ethylene isophthalate 10 | 234 | 20 |
| Comparative Example 9 | Ethylene terephthalate 90 | Ethylene isophthalate 10 | 234 | 9 |
| Comparative Example 10 | Ethylene terephthalate 90 | Ethylene isophthalate 10 | 234 | 20 |

| | Inner resin layer | | | |
|---|---|---|---|---|
| | Heat quantity of crystallization [J/g] | Heat quantity of fusion [J/g] | Heat quantity difference [J/g] | Melting point difference between inner and outer films [° C.] |
| Example 1 | 30 | 35 | 5 | 7 |
| Example 2 | 36 | 38 | 2 | 4 |
| Example 3 | 30 | 35 | 5 | 18 |
| Example 4 | 38 | 38 | 0 | 13 |
| Example 5 | 34 | 38 | 4 | 6 |
| Example 6 | 34 | 38 | 4 | 7 |
| Example 7 | 33 | 38 | 5 | 9 |
| Example 8 | 33 | 38 | 5 | 9 |
| Example 9 | 33 | 38 | 5 | 9 |
| Example 10 | 33 | 38 | 5 | 9 |
| Example 11 | 36 | 38 | 2 | 13 |
| Example 12 | 32 | 38 | 6 | 10 |
| Example 13 | 32 | 38 | 6 | 6 |
| Example 14 | 32 | 38 | 6 | 7 |
| Example 15 | 34 | 38 | 4 | 7 |
| Example 16 | 34 | 38 | 4 | 7 |
| Example 17 | 34 | 38 | 4 | 7 |
| Example 18 | 34 | 38 | 4 | 7 |
| Example 19 | 34 | 38 | 4 | 7 |
| Example 20 | 28 | 38 | 10 | 7 |
| Example 21 | 32 | 38 | 6 | 7 |
| Example 22 | 32 | 38 | 6 | 7 |

TABLE 3-continued

| | Inner resin layer | | | |
|---|---|---|---|---|
| Example 23 | 32 | 38 | 6 | 7 |
| Comparative Example 1 | 34 | 38 | 4 | 4 |
| Comparative Example 2 | 34 | 38 | 4 | 9 |
| Comparative Example 3 | 34 | 38 | 4 | 13 |
| Comparative Example 4 | 22 | 30 | 8 | 2 |
| Comparative Example 5 | 28 | 34 | 6 | 2 |
| Comparative Example 6 | 28 | 30 | 2 | 22 |
| Comparative Example 7 | 26 | 34 | 8 | 13 |
| Comparative Example 8 | 26 | 34 | 8 | 13 |
| Comparative Example 9 | 26 | 34 | 8 | 13 |
| Comparative Example 10 | 20 | 34 | 14 | 13 |

For the resin coated metal sheets of Examples 1 to 23 and Comparative Examples 1 to 10, their formability, surface roughness, corrosion resistance, and adhesion after working were evaluated using the methods listed below. The evaluation results are listed in Table 4. As listed in Table 4, whereas surface roughness was graded "⊚" or "◯" for the resin coated metal sheets of Examples 1 to 23, surface roughness was graded "×" for the resin coated metal sheets of Comparative Example 1 to 10. Referring to Table 1 and Table 2, for the resin coated metal sheets of Examples 1 to 23, the outer resin layer is formed of a resin material whose difference between the heat quantity of crystallization and the heat quantity of fusion is 20 J/g or less on a unit weight basis. In contrast, for the resin coated metal sheets of Comparative Example 1 to 10, the outer resin layer is formed of a resin material whose difference between the heat quantity of crystallization and the heat quantity of fusion exceeds 20 J/g on a unit weight basis. This demonstrates that the outer resin layer formed of a resin material whose difference between the heat quantity of crystallization and the heat quantity of fusion is 20 J/g or less on a unit weight basis reduces the occurrence of appearance defects by heat treatment.

(1) Formability

After applying wax to the resin coated metal sheets of Examples 1 to 23 and Comparative Examples 1 to 9, a disc with a diameter of 123 mm was punched to form a shallow drawn can with a drawing ratio of 1.7. Subsequently, redrawing and DI working were performed on this shallow drawn can with a drawing ratio of 1.3 to form a deep drawn can. After forming, scrapes and breakage on the surface of the resin film were visually observed to give grades in accordance with the standards listed below.

Grade "⊚⊚⊚": No film scrape was observed.
Grade "⊚⊚": A case in which a film scrape developed at a height position within 1 mm of a can flange part.
Grade "⊚": A case in which a film scrape developed at a height position apart from the can flange part by more than 1 mm and within 5 mm thereof.
Grade "◯": A case in which a film scrape developed at a height position apart from the can flange part by more than 5 mm and within 15 mm thereof.
Grade "Δ": A case in which a film scrape developed at a height position apart from the can flange part by more than 15 mm and within 30 mm thereof.
Grade "×": A case in which a film scrape developed at a height position apart from the can flange part by more than 30 mm or a case in which breakage occurred.

(2) Surface Roughness

After applying wax to the resin coated metal sheets of Examples 1 to 23 and Comparative Example 1 to 10, a disc with a diameter of 158 mm was punched to give a shallow drawn can with a drawing ratio of 1.7. Subsequently, redrawing was performed on this shallow drawn can with a drawing ratio of 1.4 to form a deep drawn can. The thus obtained deep drawn can was heated for 2 minutes in a hot air drying furnace until the can body temperature became close to the melting point of the film, and then forcibly cooled by cold air. The state of the outer film after cooling was visually observed to give grades in accordance with the standards listed below.

Grade "⊚": A state in which no black spot was observed.
Grade "◯": A state in which a black spot developed at a height position within 5 mm of a can flange part.
Grade "Δ": A state in which a black spot developed at a height position apart from the can flange part by more than 5 mm and within 15 mm thereof.
Grade "×": A state in which a black spot developed at a height position apart from the can flange part by more than 15 mm.

(3) Corrosion Resistance

The resin coating layer of the can flange part of the deep drawn can on which heat treatment was performed in the surface roughness evaluation was scraped to expose the metal sheet. A 5% saline solution was then injected into the can, and a platinum electrode was immersed into this (the immersing position was at the central part of the can). With the platinum electrode and the can flange part (a part at which steel sheet is exposed) as the cathode and the anode, respectively, a voltage of 6 V was applied between the electrodes, and a current value was read after a lapse of 4 seconds. An average value of the current values after performing measurement for 10 cans was determined to give grades in accordance with the standards listed below.

Grade "◯": A current value of less than 0.1 mA.
Grade "Δ": A current value of 0.1 mA or more and less than 1 mA.
Grade "×": A current value of 1 mA or more.

(4) Adhesion after Working

A sample for a peel test (15 mm wide×120 mm long) was cut out from the can barrel part of the deep drawn can formed in the surface roughness evaluation. The resin coating layer was partially peeled off from the long-side edge of the cut-out sample. The peeled resin coating layer was opened in a direction (at an angle of 180 degrees) opposite the metal sheet from which the resin coating layer was peeled off, and the peel test was performed with a tensile speed of 30 mm/min to evaluate adhesion per a width of 15 mm in accordance with the standards listed below. The surface for which adhesion was measured was on the inside of the can.

Grade "⊚": 1.47 N/15 mm or more (0.15 kgf/15 mm or more).

19

Grade "○": 0.98 N/15 mm or more and 1.47 N/15 mm or less (0.10 kgf/15 mm or more and 0.15 kgf/15 mm or less).

Grade "×": Less than 0.98 N/15 mm (less than 0.10 kgf/15 mm).

(5) Evaluation of Whiteness

The whiteness (L-value) of the resin coating layer 3 after resin lamination was measured to evaluate whiteness.

Grade "○": The L-value is 75 or more.

Grade "×": The L-value is less than 75.

TABLE 4

|  | Formability | Surface roughness | Corrosion resistance | Whiteness | Adhesion after working |
|---|---|---|---|---|---|
| Example 1 | ○ | ⊙ | ○ | ○ | ⊙ |
| Example 2 | ○ | ⊙ | ○ | ○ | ⊙ |
| Example 3 | ○ | ⊙ | ○ | ○ | ⊙ |
| Example 4 | ⊙ | ⊙ | ○ | ○ | ⊙ |
| Example 5 | ⊙⊙ | ○ | ○ | ○ | ⊙ |
| Example 6 | ⊙⊙ | ○ | ○ | ○ | ⊙ |
| Example 7 | ⊙⊙ | ○ | ○ | ○ | ⊙ |
| Example 8 | ⊙⊙ | ⊙ | ○ | ○ | ⊙ |
| Example 9 | ⊙⊙ | ⊙ | ○ | ○ | ⊙ |
| Example 10 | ⊙⊙ | ⊙ | ○ | ○ | ⊙ |
| Example 11 | ⊙⊙ | ○ | ○ | ○ | ⊙ |
| Example 12 | ⊙⊙ | ⊙ | ○ | ○ | ⊙ |
| Example 13 | ⊙⊙ | ⊙ | ○ | ○ | ○ |
| Example 14 | ⊙⊙ | ⊙ | ○ | ○ | ⊙ |
| Example 15 | ⊙⊙⊙ | ⊙ | ○ | ○ | ⊙ |
| Example 16 | ⊙⊙⊙ | ⊙ | ○ | ○ | ⊙ |
| Example 17 | ⊙⊙⊙ | ⊙ | ○ | ○ | ⊙ |
| Example 18 | ⊙⊙⊙ | ⊙ | ○ | ○ | ⊙ |
| Example 19 | ⊙⊙⊙ | ⊙ | ○ | ○ | ⊙ |
| Example 20 | ⊙⊙ | ⊙ | ○ | ○ | ⊙ |
| Example 21 | ⊙⊙ | ⊙ | ○ | ○ | ⊙ |
| Example 22 | ⊙⊙ | ⊙ | ○ | ○ | ⊙ |
| Example 23 | ⊙⊙ | ○ | ○ | ○ | ⊙ |
| Comparative Example 1 | X | X | ○ | ○ | ⊙ |
| Comparative Example 2 | X | X | ○ | ○ | ⊙ |
| Comparative Example 3 | ⊙⊙ | X | ○ | ○ | ⊙ |
| Comparative Example 4 | ○ | X | X | ○ | ⊙ |
| Comparative Example 5 | Δ | X | X | ○ | ⊙ |
| Comparative Example 6 | ○ | X | Δ | ○ | ⊙ |
| Comparative Example 7 | X | X | ○ | ○ | ⊙ |
| Comparative Example 8 | ○ | X | X | ○ | ⊙ |
| Comparative Example 9 | ○ | X | X | ○ | Δ |
| Comparative Example 10 | X | X | ○ | X | Δ |

INDUSTRIAL APPLICABILITY

We provide resin coated metal sheets in which no appearance defects are caused by heat treatment.

The invention claimed is:

1. A resin coated metal sheet comprising:
   a metal sheet;
   a first resin coating layer formed on one main surface of the metal sheet and formed of a resin material whose difference between a heat quantity of crystallization and a heat quantity of fusion after being laminated to the metal sheet is 6 J/g to 20 J/g on a unit weight basis; and
   a second resin coating layer formed on another main surface of the metal sheet, wherein
   the first and the second resin coating layers are formed of a resin material containing 90 mol % or more ethylene terephthalate unit, and
   a melting point of the first resin coating layer is 240° C. to 254° C.

2. The resin coated metal sheet according to claim 1, wherein intrinsic viscosity of the first and the second resin coating layers is 0.55 dl/g to 0.90 dl/g.

3. The resin coated metal sheet according to claim 1, wherein the first resin coating layer comprises titanium oxide in an amount 8 wt % to 30 wt %.

4. The resin coated metal sheet according to claim 3, wherein
   the first resin coating layer comprises a three-layer structure of an outermost layer, an intermediate layer, and a lowermost layer,
   film thickness of the outermost layer and the lowermost layer is 1 μm to 5 μm, and film thickness of the intermediate layer is 6 μm to 30 μm, and
   the outermost layer and the lowermost layer comprise titanium oxide in an amount of 0 wt % to 2 wt %, and the intermediate layer comprises titanium oxide in an amount of 10 wt % to 30 wt %.

5. The resin coated metal sheet according to claim 4, wherein a difference in melting points among the outermost layer, the intermediate layer, and the lowermost layer is 10° C. or less.

6. The resin coated metal sheet according to claim 1, wherein a melting point of the second resin coating layer is lower than the melting point of the first resin coating layer by 4° C. to 20° C.

7. The resin coated metal sheet according to claim 1, wherein the second resin coating layer is formed of a resin material whose difference between a heat quantity of crystallization and a heat quantity of fusion after being laminated to the metal sheet is 0 J/g to 10 J/g on a unit weight basis.

8. The resin coated metal sheet according to claim 1, wherein a wax component is applied to a surface of the first resin coating layer in an adhesion amount of 20 mg/m² to 80 mg/m².

9. The resin coated metal sheet according to claim 1, wherein the first resin coating layer comprises a wax component in an amount of 0.05 wt % to 5 wt %.

* * * * *

UNITED STATES PATENT AND TRADEMARK OFFICE
CERTIFICATE OF CORRECTION

PATENT NO.        : 9,506,152 B2
APPLICATION NO.   : 14/236221
DATED             : November 29, 2016
INVENTOR(S)       : Kitagawa et al.

It is certified that error appears in the above-identified patent and that said Letters Patent is hereby corrected as shown below:

On the Title Page

At (57) ABSTRACT, at Line 5, please change "6 J/g" to -- 0 J/g --.

Signed and Sealed this
Ninth Day of May, 2017

Michelle K. Lee
*Director of the United States Patent and Trademark Office*